US008226143B2

United States Patent
Takeuchi et al.

(10) Patent No.: US 8,226,143 B2
(45) Date of Patent: Jul. 24, 2012

(54) JOINT STRUCTURE OF DOOR EDGE MEMBER

(75) Inventors: Katsuhiko Takeuchi, Chita-gun (JP); Toshifumi Yanai, Kariya (JP); Kazunori Kondo, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 285 days.

(21) Appl. No.: 12/664,618

(22) PCT Filed: Nov. 28, 2008

(86) PCT No.: PCT/JP2008/071710
§ 371 (c)(1),
(2), (4) Date: Dec. 30, 2009

(87) PCT Pub. No.: WO2009/069777
PCT Pub. Date: Jun. 4, 2009

(65) Prior Publication Data
US 2010/0181798 A1    Jul. 22, 2010

(30) Foreign Application Priority Data

Nov. 29, 2007  (JP) ................. 2007-309218

(51) Int. Cl.
*B60R 13/04* (2006.01)
*B60J 5/04* (2006.01)
(52) U.S. Cl. .............. 296/1.08; 52/716.5; 296/146.9
(58) Field of Classification Search .......... 49/462, 49/490.1; 52/287.1, 288.1, 312, 716.1, 716.5, 52/717.01, 717.04, 717.05, 717.06; 296/1.08, 296/146.2, 146.3, 146.9, 146.15, 190.1; 428/31; D12/190
See application file for complete search history.

(56) References Cited

U.S. PATENT DOCUMENTS
3,246,433 A * 4/1966 Eriksson ............... 52/98
(Continued)

FOREIGN PATENT DOCUMENTS
DE        3912897 A1 * 11/1989
(Continued)

OTHER PUBLICATIONS
International Search Report (PCT/ISA/210) dated Jan. 21, 2009 for PCT/JP2008/071710.
(Continued)

*Primary Examiner* — Glenn Dayoan
*Assistant Examiner* — Paul Chenevert
(74) *Attorney, Agent, or Firm* — Buchanan Ingersoll & Rooney PC

(57) ABSTRACT

A joint structure of a door edge member (such as a garnish or trim) includes a door upper edge member having a baglike cross section (such as a partially hollow open receptacle), constituted by inner surfaces, at the longitudinal end portion thereof, and a door rear edge member having the longitudinal end portion inserted into the end portion of the door upper edge member having the baglike cross section and connected to the door upper edge member. The baglike cross section of the door upper edge member has a first cross-sectional portion provided on one end portion of the door upper edge member in the short side direction thereof, and a second cross-sectional portion provided on the other end portion side in the short side direction. A hold plate, which is inserted into the first cross-sectional portion to come into contact with the inner surface thereof, and a hold member, which is inserted into the second cross-sectional portion to come into contact with the inner surface thereof and formed of a resin integrally with the hold plate, are provided at the end portion of the door rear edge member.

8 Claims, 5 Drawing Sheets

U.S. PATENT DOCUMENTS

| | | | | |
|---|---|---|---|---|
| 3,451,709 A * | 6/1969 | Swauger | | 293/128 |
| 4,172,745 A * | 10/1979 | Van Manen | | 156/84 |
| 4,291,076 A * | 9/1981 | Katoh | | 428/31 |
| 4,408,432 A * | 10/1983 | Carter et al. | | 52/718.04 |
| 4,548,843 A * | 10/1985 | Kozuka et al. | | 428/31 |
| 4,592,127 A * | 6/1986 | Simon | | 29/451 |
| 5,001,877 A * | 3/1991 | Edwards | | 52/288.1 |
| 5,275,455 A * | 1/1994 | Harney et al. | | 296/1.08 |
| 5,376,423 A * | 12/1994 | Wiegand | | 428/99 |
| D361,545 S * | 8/1995 | Wilhelm | | D12/190 |
| 5,478,414 A * | 12/1995 | Mozelewski et al. | | 148/265 |
| 5,534,316 A * | 7/1996 | Yada et al. | | 428/31 |
| 5,555,687 A * | 9/1996 | Logan et al. | | 52/288.1 |
| 5,618,593 A * | 4/1997 | Belser et al. | | 428/31 |
| 5,697,644 A * | 12/1997 | Logan et al. | | 280/848 |
| 5,740,642 A * | 4/1998 | Koenig et al. | | 52/255 |
| 5,813,179 A * | 9/1998 | Koenig et al. | | 52/255 |
| 6,619,003 B2 * | 9/2003 | Von Arx et al. | | 52/222 |
| 6,918,223 B2 * | 7/2005 | Neidlein | | 52/716.6 |
| 7,055,291 B2 * | 6/2006 | Nakanishi et al. | | 52/716.5 |
| 7,451,576 B2 * | 11/2008 | Barone | | 52/463 |
| D633,836 S * | 3/2011 | Ogawa et al. | | D12/190 |
| 8,033,587 B2 * | 10/2011 | Yanai | | 296/1.08 |
| 2011/0006556 A1 * | 1/2011 | Lange et al. | | 296/1.08 |
| 2011/0187141 A1 * | 8/2011 | Yanai et al. | | 296/1.08 |

FOREIGN PATENT DOCUMENTS

| | | | | |
|---|---|---|---|---|
| DE | 299 02 938 U1 | | | 6/1999 |
| EP | 46002 A1 | * | | 2/1982 |
| JP | 61-129609 A | | | 8/1986 |
| JP | 61-129609 U | | | 8/1986 |
| JP | 2-23252 A | | | 2/1990 |
| JP | 2-23252 U | | | 2/1990 |
| JP | 04031124 A | * | | 2/1992 |
| JP | 9-76758 A | | | 3/1997 |
| JP | 2002-317803 A | | | 10/2002 |

OTHER PUBLICATIONS

International Search Report (PCT/ISA/210) issued on Jan. 21, 2009 by the Japanese Patent Office in its capacity as the International Searching Authority in International Application No. PCT/JP2008/071710.

Written Opinion (PCT/ISA/237) issued on Jan. 21, 2009 by the Japanese Patent Office in its capacity as the International Searching Authority in International Application No. PCT/JP2008/071710.

Extended European Search Report issued Dec. 2, 2011 by the European Patent Office in European Patent Application No. 08854243.6.

* cited by examiner

JOINT STRUCTURE OF DOOR EDGE MEMBER

The present application is based on Japanese Patent Application No. 2007-309218 filed on Nov. 29, 2007, and includes the specification, claims, and drawings thereof incorporated by reference.

TECHNICAL FIELD

This invention relates to a joint structure of a member to be attached to the edge of the door of a vehicle. The joint structure of a door edge member is useful in improving the assembling accuracy of a door joint part.

BACKGROUND ART

A door edge member, which is attached to the edge of the door of the vehicle, serves to hold a member which seals a gap between a door and the opening of a vehicle body. The door edge member protects the edge of the door frame and prevents a possible damage dealt to human body or the like by the edge of the door frame. The door edge member also serve as a design article to improve the beauty.

A door takes various shapes according to the design of the vehicle body, and often has a non-uniform curve in many cases. To be adjusted to the outer shape of a door, two or more parts of the door edge member are formed separately and then connected together. For example, a substantially uniformly curved part with a large radius of curvature, which is formed by rolling, and a largely curved part, which is formed by pressing, are connected together to be used.

To connect two door edge members, separate coupling parts are inserted to the respective end portions thereof, and then one door edge member and one coupling part, and the other door edge member and the other coupling part are connected, respectively, by welding or the like.

There has proposed an art of closing the closed cross section of the front end of a weatherstrip molding in a joint structure for a door weatherstrip molding and a door corner piece cover, and improving the wind sound prevention and quality (refer to JP 09-76758). According to the art of Patent Literature 1, a partition portion having substantially the same shape as the closed cross section of the front end of the weatherstrip molding is integrally formed at the rear protruding end of a coupling linear securely fitted over the rear end of the lower edge of the outer cover of the corner piece, and the partition portion is fitted in the closed cross section of the front end of the weatherstrip molding to close the closed cross section.

BRIEF SUMMARY OF THE INVENTION

In the conventional joint structure of a door edge member, two door edge members, for example, a rolled article, and a pressed article, are fixed by a connecting member of the press-molded article of stainless steel or the like having a constant thickness, so that the complicated shape makes a variation in connection larger, forming a clearance. In addition, because a pressed joint is a separate part, the number of parts increases, resulting in a high cost (material cost, pressing cost, the number of welded points).

The JP 09-76758 reference aims at improving the wind sound prevention and quality. However, the accuracy of connection of two members is not high, and especially the angle which is defined by two members to be connected cannot be made constant by the joint structure alone.

The present invention has been made in light of the above-mentioned circumstances, and it is an object of the invention to provide a joint structure of a door edge member which improves the assembling accuracy of the joint part.

To achieve the object, a joint structure of a door edge member according to the invention includes a first door edge member having a (such as a partially hollow open receptacle) at a longitudinal end portion thereof; a second door edge member having a longitudinal end portion inserted into the end portion of the first door edge member having the baglike cross section and connected to the first door edge member, wherein the baglike cross section of the first door edge member has a first cross-sectional portion provided on one end portion of the first door edge member in a short side direction thereof, and a second cross-sectional portion provided on an other end portion in the short side direction, and a first hold member, which is inserted into the first cross-sectional portion to come into contact with an inner surface thereof, and a second hold member, which is inserted into the second cross-sectional portion to come into contact with an inner surface thereof and formed of a resin integrally with the first hold member, are provided at the end portion of the second door edge member.

The first cross-sectional portion may include two surfaces approximately orthogonal to each other at an inner surface, the second cross-sectional portion may have opposing inner surfaces, and the first hold member may contact both of the opposing inner surfaces of the second cross-sectional portion.

The first hold member may be an extension of a member which contacts a door frame when the second door edge member is fixed to the door frame.

The second hold member may have at least one projection formed in a direction in which the second hold member is inserted into the first door edge member.

At least two projections may exist in a plane orthogonal to the direction in which the second hold member is inserted into the first door edge member, by being formed on a surface facing an inner surface of the baglike cross section of the first door edge member and.

According to the joint structure of the door edge member of the invention, the assembling accuracy of a joint part can be improved. In addition, the number of parts can be reduced. Further, because the shape is changed according to the shape of the mate, the fitting force is improved.

DESCRIPTION OF REFERENCE NUMERALS

1 door edge member
2 door upper edge member (first door edge member)

2*a* inner surface (baglike cross section, first cross-sectional portion)
2*b* inner surface (baglike cross section, second cross-sectional portion)
2*c* inner surface (baglike cross section, second cross-sectional portion)
2*d* inner surface (baglike cross section, first cross-sectional portion)
3 door rear edge member (second door edge member)
4 hold plate (first hold member)
5 hold member (second hold member)
6 door frame

DETAILED DESCRIPTION OF THE INVENTION

Figure 1:
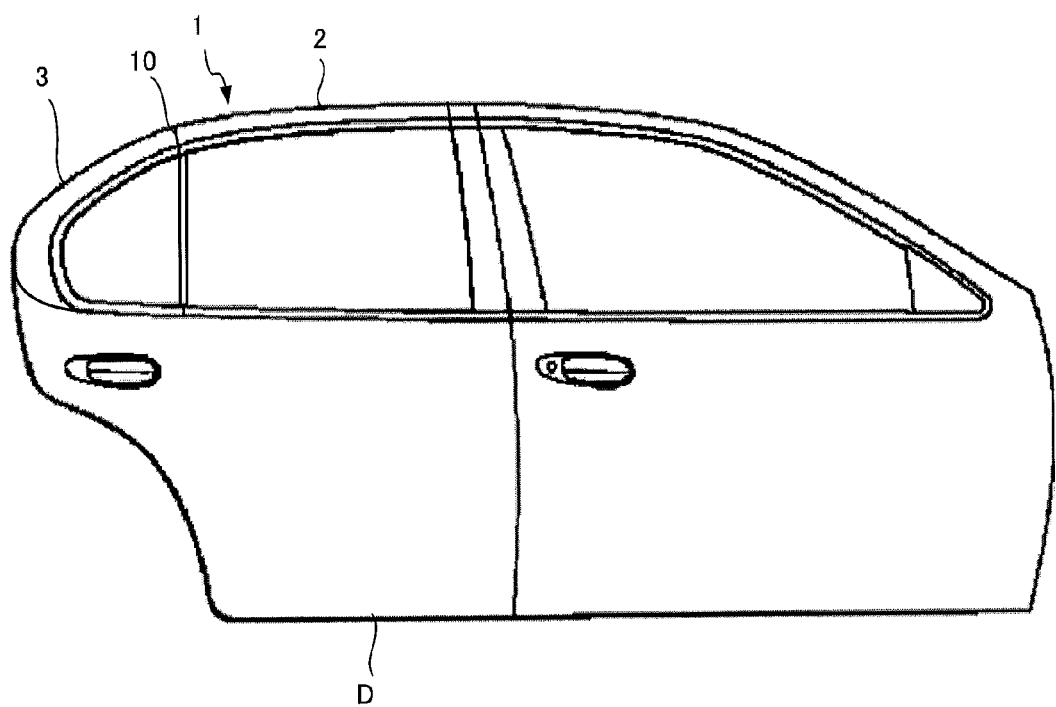
FIG. 1 is a diagram showing a door edge member according to an embodiment of the invention.

One embodiment of a joint structure of a door edge member according to the invention will be described with reference to the diagrams. FIG. 1 is a diagram showing a door edge member 1 according to the embodiment of the invention. The door edge member 1 is attached to the edge of the upper portion of a door D on the right backseat side of a vehicle. As shown in FIG. 1, the door edge member 1 is configured to include a door upper edge member 2 and a door rear edge member 3. The door upper edge member 2 and the door rear edge member 3 are connected at a joint part 10.

Figure 2:
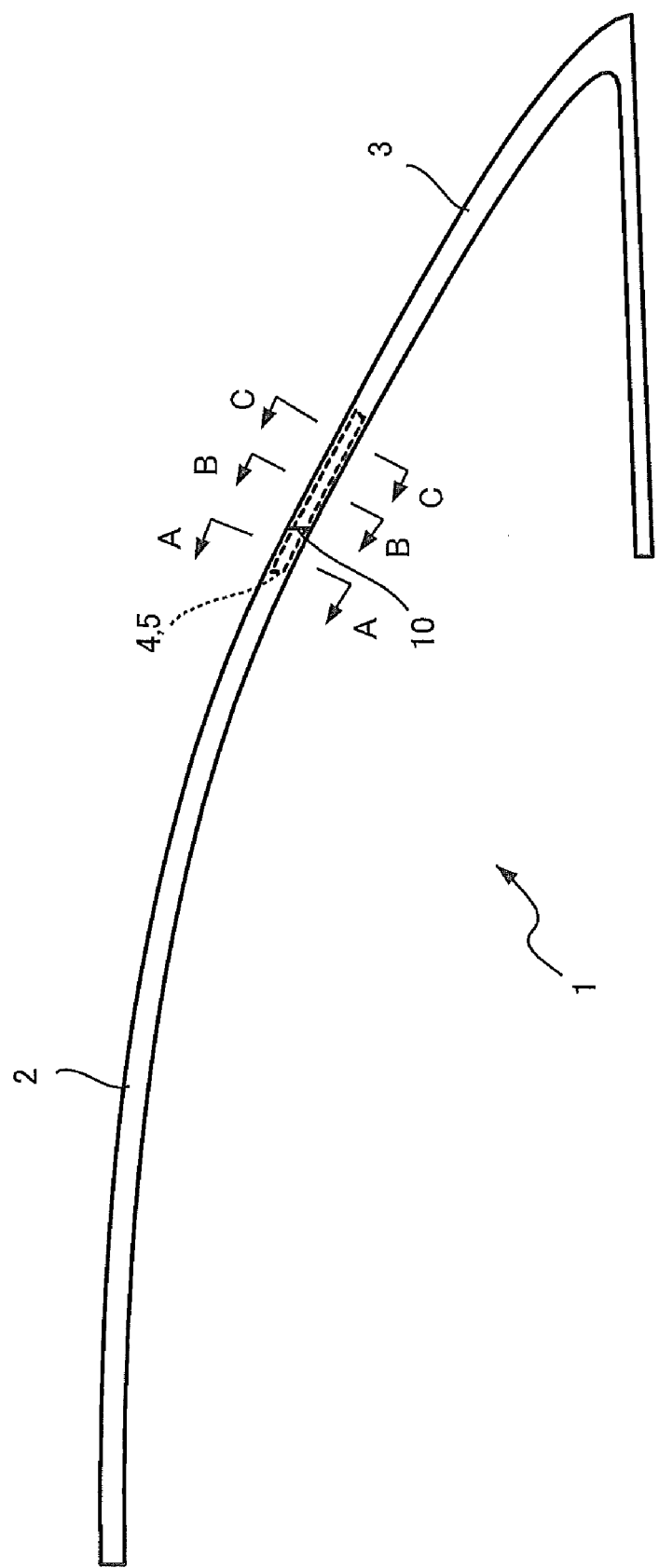
FIG. 2 is a diagram showing the outline of the door edge member according to the embodiment of the invention.

FIG. 2 is a diagram showing the outline of the door edge member 1. FIG. 2 is the diagram of the door edge member 1 of the right backseat door as viewed from the inside of the vehicle. While the door edge member 1 actually has a door frame attaching part and a sealant hold part, they are omitted in FIG. 2 for easier understanding. The door edge member 1 is configured to include the door upper edge member 2 and the door rear edge member 3. The door upper edge member 2 has a substantially uniformly curved portion with a large radius of curvature. Therefore, the door upper edge member 2 is formed by rolling. The door rear edge member 3 is bent significantly along the window frame of the door rear portion. Accordingly, the door rear edge member 3 is formed by pressing.

Because the door edge member 1 is also a design part decorating the edge of the door D, it may be called garnish or trim. It is formed by, for example, a stainless steel plate (SUS) as a material, so that it is not easily rusted even by scratching.

The door upper edge member 2 and the door rear edge member 3 are connected at the joint part 10. A hold plate 4 and a hold member 5 are provided at the door rear edge member 3. The door upper edge member 2 and the door rear edge member 3 are combined as the hold plate 4 and the hold member 5 are inserted into an after-mentioned insertion portion which is at the end portion of the door upper edge member 2. The door upper edge member 2 and the door rear edge member 3 are secured to each other as the hold plate 4 integrated with the hold member 5 is connected to the door upper edge member 2 by, for example, spot welding or the like.

Figure 3:
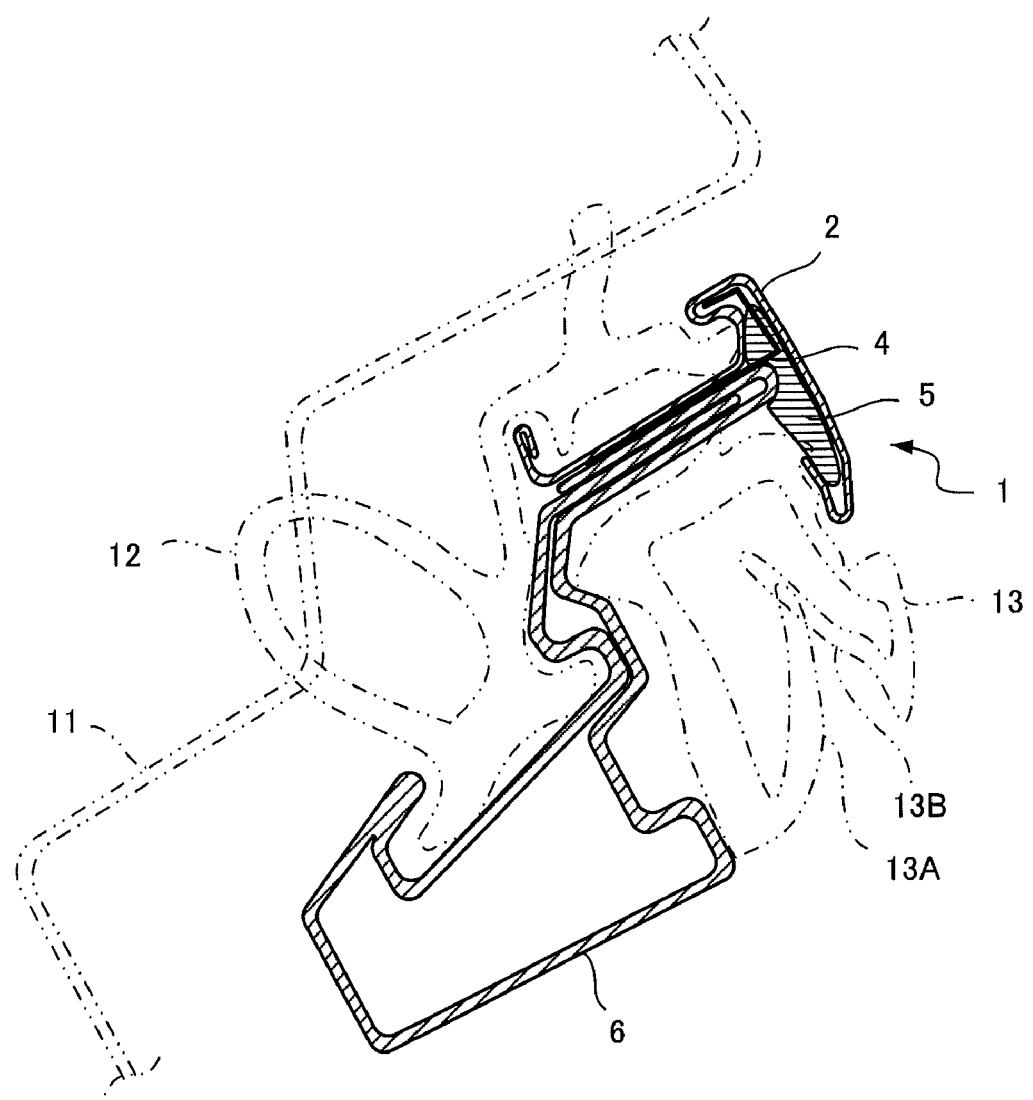
FIG. 3 is a cross-sectional view of a door frame and the door edge member.

FIG. 3 is a diagram showing the cross sections of a door frame 6 and the door edge member 1 at a position indicated by line A-A in FIG. 2, together with a door opening frame 11, a door seal 12 and a window seal 13 indicated by chain lines. The cross sections shown in FIG. 3 are the cross sections of the door frame 6 and the door edge member 1 as seen frontward from the rear of the vehicle.

FIG. 3 shows the door edge member 1, the door frame 6, the door opening frame 11 of the vehicle body, the door seal 12, and the window seal 13 at the positional relation thereof when the door is closed. The door seal 12 is formed of elastic rubber or the like. Therefore, when the door is closed, the door seal 12 should originally be deformed to be in close contact with the door opening frame 11, thus preventing the wind and rain from entering from the periphery of the door. FIG. 3 shows the door seal 12 in a non-deformed state for the sake of descriptive convenience.

The window seal 13 like the door seal 12 is formed of elastic rubber or the like, and has flaps 13A and 13B. As the window glass is held by the flaps 13A and 13B, the window seal 13 prevents the wind and rain from entering from the upper portion of the window glass.

FIG. 3 shows the door upper edge member 2 of the door edge member 1, the hold plate 4 and the hold member 5. As apparent from FIG. 3, the door edge member 1 is fixed to the attachment part formed at the periphery of the door frame 6. The door seal 12 is held at the door frame 6 and the door edge member 1. The window seal 13 is held at the door frame 6 and the door edge member 1.

The hold plate 4 and the hold member 5 provided at the door rear edge member 3 are inserted into the after-mentioned insertion portion at the end portion of the door upper edge member 2 to be in close contact with the inner surface of the door upper edge member 2. The hold plate 4 is formed by, for example, pressing. The hold member 5 is formed of a resin as a material, and is integrated with the hold plate 4. For example, glass fiber reinforced polypropylene (PP) or the like is used as the material for the hold member 5.

Figure 4:
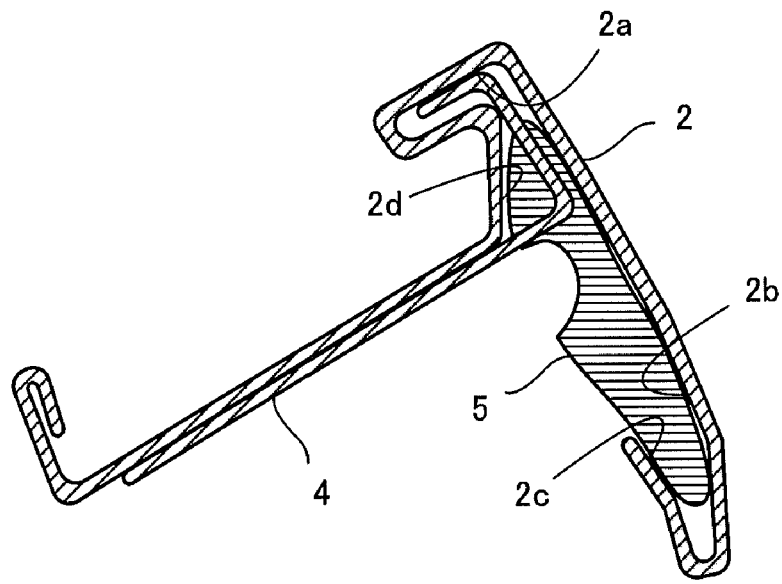
FIG. 4 is a cross-sectional view of the door edge member shown in FIG. 2 along line A-A.

FIG. 4 shows a cross section at the position indicated by the line A-A in FIG. 2. A baglike portion (hereinafter called insertion portion) constituted by inner surfaces 2*a*, 2*b*, 2*c* and 2*d* is formed at the door upper edge member 2 in such a way that the inserted hold plate 4 and hold member 5 do not move in a direction, for example, parallel to the sheet surface. The hold plate 4 is in contact with at least one of the substantially orthogonal inner surfaces 2*a*, 2*b* of the baglike cross section of the insertion portion without a gap. The hold plate 4 contacts especially the inner surfaces 2*a*, 2*d* of the insertion portion.

The hold member 5 is in contact with the inner surfaces 2*b*, 2*c* (inner surface 2*d* too in some case) of the baglike cross section of the insertion portion. In addition, the hold plate 4 and the hold member 5 are integrated. With the hold plate 4 and the hold member 5 being inserted into the insertion portion of the door upper edge member 2, therefore, they do not move in a direction, for example, parallel to the sheet surface. Further, the hold plate 4 and the hold member 5 are fixed to the door rear edge member 3. As the hold plate 4 and the hold member 5 are inserted into the insertion portion of the door upper edge member 2, therefore, the relative positions of the door rear edge member 3 and the door upper edge member 2 are determined uniquely. As the hold plate 4 and the hold member 5 are inserted into the insertion portion of the door upper edge member 2, and the hold plate 4 is fixed to the door upper edge member 2 by, for example, spot welding, therefore, the door rear edge member 3 and the door upper edge member 2 are combined in a predetermined positional relation to be integrated.

Figure 5:
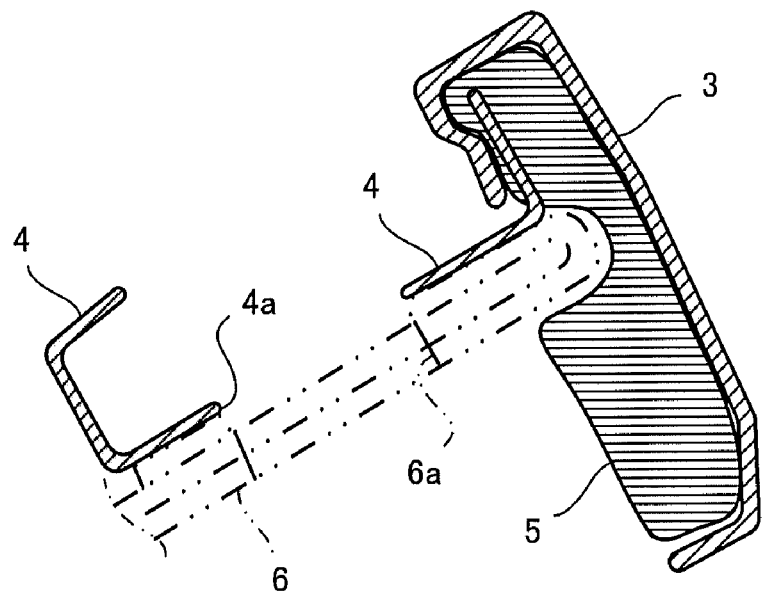
FIG. 5 is a cross-sectional view of the door edge member shown in FIG. 2 along line B-B.

FIG. 5 is a diagram showing the cross section at a position indicated by a line B-B in FIG. 2. FIG. 5 shows the hold plate 4 and the hold member 5, provided at the door rear edge member 3, together with the door rear edge member 3. The hold plate 4 and the hold member 5 integrated with each other are fixed to the door rear edge member 3 by caulking or the like.

The hold plate 4 extends so as to overlap the door frame 6, and has a hole 4*a* formed at the extended portion. A mount hole 6*a* is formed in the door frame 6 at a portion corresponding to the hole 4*a*. The door edge member 1 is fixed to the door frame 6 by an unillustrated rivet or the like which is inserted in such a way as to penetrate, for example, the hole 4a and the mount hole 6a.

Figure 6:
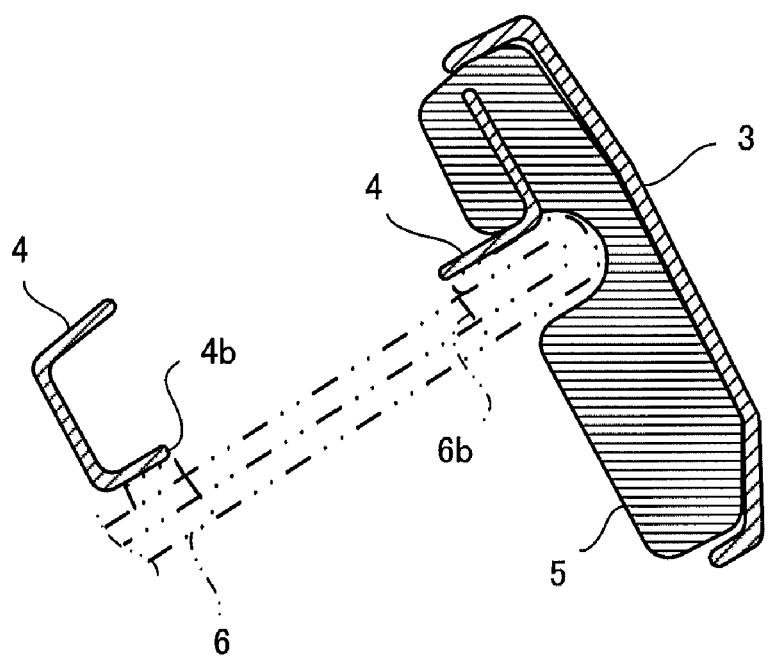
FIG. 6 is a cross-sectional view of the door edge member shown in FIG. 2 along line C-C.

FIG. 6 is a diagram showing a cross section at a position indicated by a line C-C in FIG. 2. A hole 4b is likewise formed in the door edge member 1 at a position corresponding to the C-C line. A mount hole 6b is formed in the door frame 6 at a position corresponding to the hole 4b. Unillustrated projections formed at the door seal 12, for example, are inserted into the hole 4b and the mount hole 6b. The door seal 12 is attached to the hole plate 4 in such a state.

Figure 7:
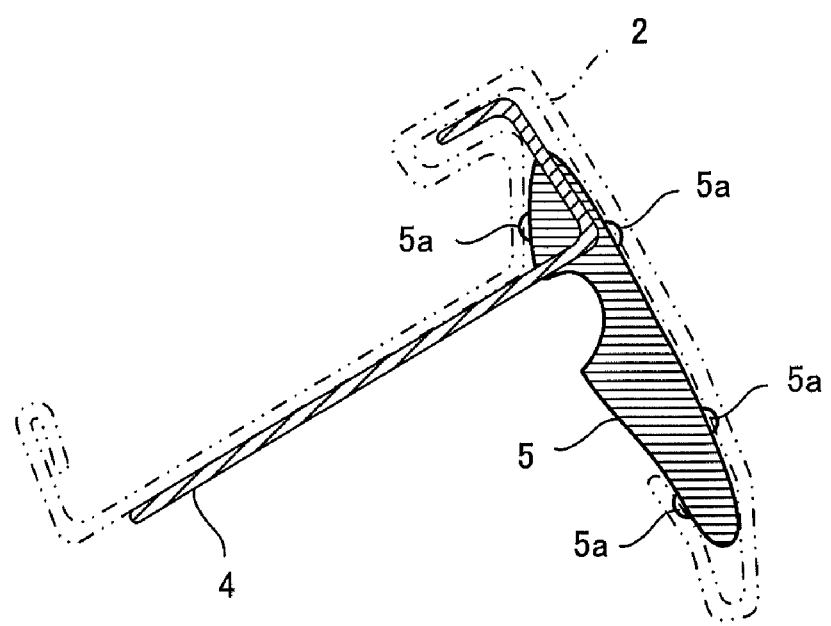
FIG. 7 is a cross-sectional view of a hold member before insertion.

FIG. 7 is a cross-sectional view of the hold plate 4 and the hold member 5 before being inserted into the insertion portion formed at the door upper edge member 2. As shown in FIG. 7, a plurality of projections 5a consecutive along the insertion direction (direction perpendicular to the sheet surface). The projections 5a are press fitted to the inner surfaces 2a to 2d of the insertion portion in a deformed state when the hold member 5 is inserted into the insertion portion formed at the door upper edge member 2. This eliminates the play of the door upper edge member 2 and the door rear edge member 3 at the joint part 10. Then, the door upper edge member 2 and the door rear edge member 3 are firmly connected together.

It is difficult to shape the shape of the hold member 5 with such an accuracy that the hold member 5 is just fitted into the insertion portion formed at the door upper edge member 2. In a case where the cross section is too larger due to an increase in the thickness of the hold member 5, for example, the resistive force at the time of inserting the hold member 5 into the insertion portion of the door upper edge member 2 is increased more than necessary. In this case, it is difficult to assemble the door upper edge member 2 and the door rear edge member 3. Accordingly, the hold member 5 is formed so that a slight clearance can be formed between the top surface of the hold member 5 and the inner surface of the insertion portion formed at the door upper edge member 2. At the same time, the projections 5a which are deformed (or cut) according to the clearance are formed on the top surface of the hold member 5. This can achieve both easier assembly and accuracy at the same time.

As for the projections 5a formed on the hold member 5, it is desirable that at least two projections 5a abut on the inner surface 2b among the inner surfaces of the insertion portion of the door upper edge member 2, at least one projection 5a abutting on the inner surface 2c and at least one projection 5a abutting on the inner surface 2d should be included in one place parallel to the surface of the sheet of FIG. 7. At the time the hold member 5 is inserted into insertion portion of the door upper edge member 2, therefore, the posture of the hold member 5 with respect to the inner surfaces of the insertion portion of the door upper edge member 2 is stabilized.

According to the joint structure of the door edge member 1 of the invention, as described above, the assembling accuracy of the joint part can be improved. In addition, because the hold plate 4 is extended along the door frame 6, the hold plate 4 can be fixed directly to the door frame 6. That is, the door edge member 1 can be fixed to the door frame 6 without requiring another member. Further, the projections 5a provided on the hold member 5 to be inserted into the insertion portion are deformed according to the clearance between the top surface of the hold member 5 and the inner surface of the insertion portion, the fitting force is improved and the inserted hold plate 4 and hold member 5 do not move inside the insertion portion. Furthermore, the deformation of the projections 5a of the hold member 5 can permit the door edge member 1 to be assembled with high accuracy and easily even with an individual difference in hold members 5.

In addition, the shape of the door edge member 1 is illustrative, and can be changed and corrected without departing from the idea of the invention. Although the door edge member 1 of the backseat door upper portion has been described in the description of the embodiment by way of example, the embodiment can be applied to other door edge members too in a case where divided parts are connected in use.

The invention claimed is:

1. A joint structure of a door edge member comprising:
a first door edge member having a baglike cross section at a longitudinal end portion thereof;
a second door edge member having a longitudinal end portion inserted into the end portion of the first door edge member having the baglike cross section and connected to the first door edge member,
wherein the baglike cross section of the first door edge member has a first cross-sectional portion provided on one end portion of the first door edge member in a short side direction thereof, and a second cross-sectional portion provided on an other end portion in the short side direction, and
a first hold member wherein the longitudinal end portion of the second door edge member includes, which is inserted into the first cross-sectional portion to come into contact with an inner surface thereof, and a second hold member, which is inserted into the second cross-sectional portion to come into contact with an inner surface thereof and formed of a resin integrally with the first hold member.

2. The joint structure according to claim 1, wherein the first hold member is an extension of a member which contacts a door frame when the second door edge member is fixed to the door frame.

3. The joint structure according to claim 2, wherein the second hold member has at least one projection formed in a direction in which the second hold member is inserted into the first door edge member.

4. The joint structure according to claim 1, wherein the second hold member has at least one projection formed in a direction in which the second hold member is inserted into the first door edge member.

5. The joint structure according to claim 4, wherein at least two projections exist in a plane orthogonal to the direction in which the second hold member is inserted into the first door edge member, by being formed on a surface facing an inner surface of the baglike cross section of the first door edge member.

6. The joint structure according to claim 1, wherein the first cross-sectional portion includes two surfaces approximately orthogonal to each other at an inner surface,
the second cross-sectional portion has opposing inner surfaces, and
the first hold member contacts both of the opposing inner surfaces of the second cross-sectional portion.

7. The joint structure according to claim 6, wherein the first hold member is an extension of a member which contacts a door frame when the second door edge member is fixed to the door frame.

8. The joint structure according to claim 6, wherein the second hold member has at least one projection formed in a direction in which the second hold member is inserted into the first door edge member.

* * * * *